Feb. 24, 1959   V. T. DE JARNETTE ET AL   2,874,658
LIQUID INJECTION DEVICE FOR ROOT SYSTEMS
Filed Jan. 17, 1958
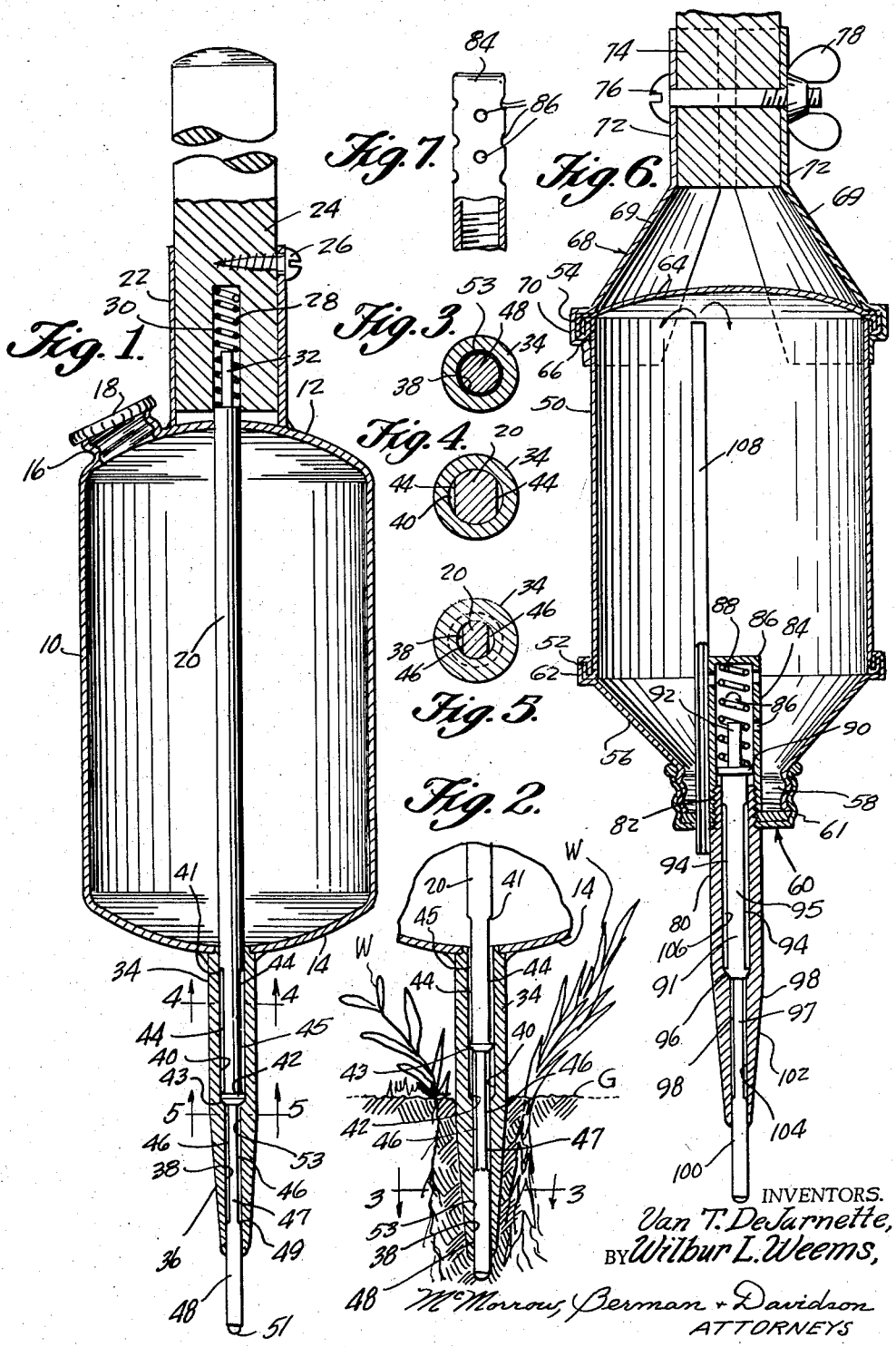
INVENTORS.
Van T. DeJarnette,
BY Wilbur L. Weems,
McMorrow, Berman + Davidson
ATTORNEYS

United States Patent Office 2,874,658
Patented Feb. 24, 1959

2,874,658

LIQUID INJECTION DEVICE FOR ROOT SYSTEMS

Van T. De Jarnette and Wilbur L. Weems, Baltimore, Md.

Application January 17, 1958, Serial No. 709,518

1 Claim. (Cl. 111—7.3)

This invention relates to a hand-operated device for injecting liquids into or adjacent the root systems of plants.

The device has its main, but not its only use, as an applicator of weed-killing solutions. As will presently appear, however, the device can also be used to advantage in injecting fertilizer or starter solutions adjacent plant roots, so as to supply the plants with plant foods in either concentrated or dilute form.

Hereinafter, the device will be designated as a weed-killing solution injector, in the interest of conciseness. However, it will be understood that the device has the other use, and perhaps even additional uses, indicated above.

In any event, it has been found that in the injection of weed-killing solutions, danger to adjacent plants is often present, if the solution is not applied accurately and is not confined to the particular area where it is intended to accomplish its weed-killing function. Thus, the use of weed-killing solutions adjacent flower beds often results in the fact that the flowers or other plants contained in said beds are adversely affected, and often killed. This is by reason of the fact that weed-killing solutions in many instances kill all broad-leaved plants indiscriminately, when applied to the foliage.

Heretofore, it has been proposed to provide means for injecting weed-killing solution into the root systems of plants, or for applying small quantities of said solution to individual weeds. However, said means has not always acted with full efficiency, and in addition has failed to limit the injection of the weed-killing solution to a quantity sufficient to accomplish the killing function while not producing waste of the solution.

One important object of the present invention, accordingly, is to provide a device of the character stated that will discharge a quantity of the weed-killing solution found to be just the amount necessary for killing the plant, without producing waste at the same time.

Another object is to provide a device of the character described which will have a semi-metering function, that will roughly meter out a few droplets of the device each time the device is operated for the purpose of injecting liquids into a root system of a weed.

Another object is to provide a device of the character stated that will be so formed that it will hold a substantial quantity of the weed-killing solution, thus requiring refilling at relatively infrequent intervals.

Another object of importance is to provide an injector for weed-killing solutions, which injector will cause dispensing of the solution responsive merely to downward pressure exerted upon a handle, following location of the injecting tip at the center of the weed. In this connection, devices previously conceived for the same general purpose discharged responsive to a downward pressure exerted on the device, but such devices are often indiscriminate in respect to the amount and the direction in which the liquid is dispensed.

Another object is to provide a device of the character stated which, in at least one form of the invention, will be connectible to opposite ends of a disposable container of the weed-killing solution. In other words, in this form of the invention one may apply cooperating portions of the device to the opposite ends of the container, said container being that in which the weed-killing solution is sold. The container then becomes the reservoir for the weed-killing fluid, and when the same is completely exhausted, the container may be disposed of and the cooperating components of the injecting device may be attached to a container of the same kind having a fresh supply of the solution.

Other objects will appear from the following description, the claims appended thereto, and from the annexed drawing, in which like reference characters designate like parts throughout the several views, and wherein:

Figure 1 is a longitudinal sectional view through a device according to the present invention, a portion of the handle being broken away from the valve stem being illustrated in its normal, container-closing position;

Figure 2 is a fragmentary longitudinal section view on the same cutting plane as Figure 1, in which the valve stem has been retracted to permit the discharge of the fluid during use of the device;

Figure 3 is an enlarged transverse sectional view substantially on line 3—3 of Figure 2;

Figures 4 and 5 are enlarged transverse sections on lines 4—4 and 5—5, respectively, of Figure 1;

Figure 6 is a view like Figure 1 showing a modified construction; and

Figure 7 is a view partly in section and partly in elevation of a spring retainer embodied in the modified form shown in Figure 6.

Referring to the drawing in detail, in the form of the invention shown in Figures 1–5 we provide a cylindrical container 10, constituting a permanent portion of the device, said container being adapted to hold a suitable quantity of a liquid to be dispensed, said liquid being either in concentrated or in dilute form, according to the particular type of liquid used and the purpose to be made thereof.

The container 10 is provided with concavo-convex, outwardly bowed upper and lower end walls 12, 14 respectively, and in the top wall 12 there is provided a filler opening surrounded by an upstanding, threaded filler neck 16 in which is threadedly engaged a complementarily threaded filler plug 18.

Extending axially within the container 10 is a valve stem 20, the opposite extremities of which project beyond the opposite ends of the container 10, in a manner to be described in full detail hereinafter.

Fixedly secured to the top wall 12, centrally thereof, is an upstanding ferrule 22, receiving the lower end portion of an elongated handle 24, which is fixedly secured within the ferrule by means of a screw 26 or equivalent fastener means extending through an opening of the ferrule and threadedly engaged in the handle.

The handle 24 is formed with an axial recess 28, and a compression, coil spring 30 bears in said recess, said spring surrounding a reduced axial extension 32 formed upon the upper end of the stem 20. The spring thus bears upon a shoulder defined at the base of the extension 32, so as to resiliently, yieldably bias the stem 20 axially downwardly within the container.

Fixedly secured to the lower end wall 14 is an elongated nozzle 34, coaxially aligned with the container 10 and welded to or otherwise attached to the end wall 14 in position communicating with the interior of the container. Nozzle 34 has an exteriorly tapered outer end portion 36, shaped to enter the ground, at the location of a weed, with minimum difficulty.

An axial, end-to-end bore 38 is formed in the nozzle 34, and said bore 38 is maintained at a constant, smaller diameter for approximately half its length, that is, from the distal end of the nozzle 34 to a location substantially medially between opposite ends of the nozzle. At this point, the bore is increased in diameter, fully to the proximal end of the nozzle, as at 40, that is, the nozzle has a counterbore 40 which is of a constant diameter slightly greater than the diameter of the outer end portion of the bore.

This defines a shoulder at the junction of the smaller and larger diameter portions of the bore, and said shoulder is tapered downwardly to provide a seat 42 for a complementarily shaped shoulder 43 formed upon the valve stem 20.

The particular shape of the valve stem is of importance. As will be noted, the valve stem is of constant diameter so far as the portion normally extending between the walls 12, 14 is concerned (see Figure 1). The portion of the valve stem that extends through the nozzle, however, has a part of reduced cross section, defined by diametrically opposed, flatly recessed faces 44 of the stem. This reduction in cross-sectional area of the stem extends for an appreciable part of the length of the stem, slightly less than half the length of the nozzle. The valve stem part so recessed has been designated at 45, and terminates at one end at the shoulder 43, terminating at the other end at an innermost shoulder 41 disposed inside the nozzle in the normal position of the valve stem, downwardly a short distance from the wall 14, as shown in Figure 1.

Below the shoulder 43, the valve stem has a part 47 which has flatly machined, diametrically opposed faces 46, reducing the cross-sectional area of the part 47 so that the cross-sectional area of part 47 is even less than that of the part 45. The length of the reduced part 47 extends from the shoulder 43 downwardly to a shoulder 49 disposed inwardly a short distance from the tip 51 of the nozzle. Between the shoulder 49 and the tip 51, the nozzle is of circular cross-section as shown in Figure 3. The diameter of the part 48 having the circular cross-section is distinctly less than the diameter of the reduced outer bore portion 53 within which part 48 is slidably engaged.

The lower diameter of the part 48 is clearly seen from Figure 3, and this permits the flow of the liquid about the part 48 out of the tip of the nozzle.

In use of the device, the parts appear as in Figure 1, normally. The nozzle is injected into the ground G into or adjacent the root systems of weeds W. The injection of the nozzle causes the stem 20 to be retracted against the restraint of the spring 30, from the Figure 1 to the Figure 2 position. As a result, liquid flows into the nozzle, by reason of the fact that the shoulder 41 moves above the wall 14, as shown in Figure 2. Since the stem 20 now has its part 45 extending partway into the container, liquid can flow about the part 45 into the bore portion 40.

The liquid flows downwardly within bore portion 40 below shoulder 43, which of course has been unseated and has been moved upwardly off the seat 42. The liquid flows downwardly about part 47 of the stem, into bore portion 53.

The user now releases the downward pressure on the device, and as he begins to extract the device the stem 20 is biased back to its Figure 1 position. Liquid already is flowing about the part 48 out of the nozzle, even before the downward pressure has been released. However, when the downward pressure is released and the nozzle begins to move out of the ground, the axial, downward movement of the stem 20 causes the remaining liquid within the bore to be forced even more strongly out of the nozzle, and the shoulder 43 forces the liquid, piston fashion, downwardly out of the nozzle preliminary to full seating of the shoulder 43 upon the shoulder 42.

Of course, with the shoulder 43 fully seated and the large diameter, main portion of stem 20 filling the opening of the wall 14, no liquid will be discharged while the device is being moved to the next plant.

A semi-metering function is discharged by the stem, since the downward pressure and the almost immediately following upward movement causes a retraction of the stem 20 to its Figure 2 position only for a more or less predetermined, short time. The particular formation of the valve stem is such as to permit only a restricted quantity of fluid to move into the bore of the nozzle and to be discharged from the bore, said quantity thus eliminating waste and even permitting the use of weed-killing solution in a wholly or almost completely concentrated form, designed to obtain maximum results even though only a few droplets of the liquid are dispensed on each injection.

Referring now to Figure 6, in this form there is shown a modified construction designed to permit the invention to be associated with a disposable container. Thus, the container can be that in which the weed-killing solution is sold. One need only connect the handle assembly to one end of the container and the nozzle assembly to the other end, so that the device is ready for use.

In this form, the container 50 is the one in which the weed-killing solution is merchandised, and is a disposable container. Container 50 has a cylindrical body portion, one end of which is formed with an outwardly rolled flange 52 and the other end of which is formed with a similarly rolled flange or bead 54. A frusto-conical end wall 56 of the container has a threaded neck 58 at its smaller end, to which neck is applied the nozzle assembly of the device, generally designated 60. End wall 56 has at its larger end a flange or bead 62 interfitted with the bead 52.

The other end of the container has an end wall 64, provided with a bead 66 interengaged with the bead 54.

Generally designated at 68 is the handle assembly and this is connected to the ends of the container at which wall 64 is provided.

The handle assembly includes opposite but identical ferrule members 69, downwardly divergent as shown in Figure 6 and formed at their divergent ends with flange portions 70 clampably engaging over the interfitted beads 54, 66 of the container. The ferrule elements 69 at their convergent ends are integral with ferrule sections 72 embracing the inner ends of a handle 74 and having openings aligned with a transverse bore of the handle to receive a connecting bolt 76 to which is applied a wing nut 78. On tightening of the wing nut, the ferrule members 69 not only are securely connected to the handle, but also, are drawn toward each other into clamping engagement with diametrically opposite portions of the container. Thus, a strong, fixed, and yet quickly detachable connection of the handle assembly 68 to the container 50 is provided.

Referring now to the nozzle assembly 60, this includes a centrally apertured, threaded cap 61. A nozzle 80, at its inner or proximal end, has a reduced, externally threaded extension 82 extending through a center opening of the cap 60. The cap 60 may have a gasket, not shown, bearing against the neck 58 to prevent leakage.

A cylindrical spring retainer or cylinder 84 is disposed within the container, and has a plurality of openings 86 in its side wall. At one end retainer 84 is closed, providing an abutment for the compression spring 88. Spring 88 at its other end bears against a piston 90 formed at the base of a reduced, axial extension 92 of a valve stem 91. Valve stem 91, below the piston 90, is actually identical to the valve stem 20, and the same is true of the nozzle. Thus, valve stem 91 reciprocates axially within a nozzle 80 having an externally tapered distal end portion 102. Valve stem 91 has diametrically opposed flat surfaces 94 reducing the cross-sectional area thereof to provide a part 95 of the stem corresponding to the part 45 of stem 20. The valve stem also has a shoulder 96 analogous to shoulder 93, and below shoulder 96 there is a part 97 of the valve stem having diametrically opposed flat surfaces 98 and bearing analogy to the part 47. Below the part 97 of the valve stem, there is a tip portion 100 analogous to the portion 48.

The valve stem works in a nozzle having an exteriorly tapered outer end portion 102 and having an axial bore 104 provided with a counterbore 106, identically to the nozzle of the first form of the invention.

Designated at 108 is an air venting tube. This is secured to and within the cap 61, so that when the cap is threaded onto the container and the device is ready for use as at Figure 6, tube 108 will extend upwardly within the container, terminating adjacent wall 64, so that air entering the tube to replace liquid displaced from the container will not travel through the liquid and will move into the container above the level of the liquid.

The piston 90 discharges a pumping function, that is, when the device is inserted into the soil, and stem 91 is retracted against the restraint of the spring, the piston 90 will move upwardly within the cylinder. The opening 86 permits any liquid within the cylinder to move outwardly so that there is no resistance to the upward movement of the piston. However, the piston moves past a number of the openings 86 during its upward movement. Therefore, liquid will reenter the cylinder through the opening passed by the piston. Then, when spring 88 is being permitted to expand to extend the stem once again, piston 90 will begin to move downwardly and eventually will move below the lowermost opening 86. All liquid trapped in the cylinder 84 below the piston will now be forced into the bore of the nozzle until the reduced part 95 of the valve stem no longer projects partway above the inner extremity of the nozzle. This causes the discharge of the liquid through the nozzle with increased velocity, causing the metered droplets of the liquid to be discharged from the tip of the nozzle in a jet form designed to cause maximum penetration of the root system of the weed.

Of course, when the container 50 is exhausted of its contents, the nozzle assembly 60 and the handle assembly 68 are swiftly detached, to be connected to a new container having a fresh supply of liquid.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A device for injecting a liquid into or adjacent the root system of a plant comprising, in combination with a container: a dispensing nozzle communicating with and extending from said container, the nozzle having an end-to-end axial bore formed with a counterbore extending from the inlet end of the axial bore to a location intermediate the inlet and outlet ends thereof, whereby to define a shoulder at said location; a stem mounted in the nozzle for axial sliding movement between retracted and extended extreme positions, the stem being under spring bias tending to shift the same toward its extended position, said stem including a shoulder intermediate its ends bearing against the first shoulder in the extended position of the stem, the stem including a main portion of the same diameter as the counterbore slidably engaged with the wall of the counterbore and extending through the inlet end of the nozzle, a first reduced-diameter part extending from the main portion to the shoulder of the stem and having a surface spaced from the wall of the counterbore to permit the flow of liquid between said surface and said wall, a second reduced-diameter part extending from the shoulder of the stem to a location spaced from the outer end of the stem, the second part having a surface spaced from the wall of said outer end portion of the axial bore to permit flow of liquids therebetween, a third reduced-diameter part the diameter of which is less than that of the first reduced-diameter part but greater than that of the second part, the second and third reduced-diameter parts extending within the outer end portion of the bore, said third reduced-diameter part being of circular cross section and being slightly smaller in diameter than the diameter of said outer end portion of the bore to an extent sufficient to permit liquids to flow in an annular column out of the discharge end of the nozzle about said third part, the stem, when in its extended position, having its main portion engaged in and closing the inlet end of the axial bore, its first reduced-diameter part extending wholly in the counterbore, its second reduced-diameter part extending wholly in said outer end portion of the axial bore, and its third reduced-diameter part extending partly within the outer end portion and partly exteriorly of the nozzle beyond the outlet end of the nozzle, the stem when in its retracted position having its main portion wholly retracted within the container from the nozzle, its first reduced-diameter part partly within the container and partly within the counterbore, its second reduced-diameter part partly in the counterbore and partly in the outer end portion of the axial bore, and its third reduced-diameter part partly in the outer end portion and partly exteriorly of the nozzle.

References Cited in the file of this patent

UNITED STATES PATENTS

| | | |
|---|---|---|
| 1,836,259 | Leon | Dec. 15, 1931 |
| 1,895,693 | Tracy | Jan. 31, 1933 |
| 1,960,738 | Giezentanner | May 29, 1934 |